Patented Aug. 8, 1950

2,518,020

UNITED STATES PATENT OFFICE 2,518,020

DYESTUFFS OF THE STILBENE SERIES AND A PROCESS FOR THEIR MANUFACTURE

Markus Kappeler, Basel, Switzerland, assignor to Sandoz Ltd., Fribourg, Switzerland, a Swiss firm No Drawing. Application March 8, 1945, Serial No. 581,714. In Switzerland January 10, 1944

Section 1, Public Law 690, August 8, 1946
Patent expires January 10, 1964

14 Claims. (Cl. 260—166)

This invention relates to new dyestuffs of the stilbene series which dye cellulosic fibres in yellow, orange, red, brown or violet to grey shades possessing good fastness properties, especially a good fastness to light, and to a process for their manufacture.

It has been found that new valuable dyestuffs can be obtained by condensing compounds like 4:4'-dinitrostilbene-2:2'-disulphonic acid or 4:4'-dinitrodibenzyl 2:2'-disulphonic acid or 4-nitrotoluene-2-sulphonic acid, or the dyestuffs obtained by treating 4-nitrotoluene-2-sulphonic acid with caustic alkali, with aromatic compounds containing no primary amino group and selected from the group consisting of aromatic compounds of the benzene series and of monoazo compounds of the phenyl-azo-phenyl and phenyl-azo-naphthalene series, which compounds contain the nuclear-bound group

—NH.X in which X stands for methyl, ethyl, hydroxyethyl, dihydroxypropyl, carboxymethyl, sulfoethyl or hydroxysulfoethyl. The dyestuffs thus obtained can further be subjected to the after-treatments applied to the dyestuffs of these series by means of oxidation or reducing agents. If the aromatic compounds containing the nuclear-bound group NH.X contain atom groups which can be metallized, these compounds can be used for the condensation either in the form of their metal complex compounds or as metal free compounds; in the latter case the stilbene dyestuffs obtained therefrom can be after-treated with metallizing compounds.

It is known that the nitro compounds above cited can be condensed if necessary under pressure with aromatic amines or aminoazo dyestuffs or mixtures thereof and that the condensation products thus obtained can be subjected to an after-treatment with reducing, oxidising or metallizing agents, or with a plurality of such agents.

Heretofore only compounds containing a primary amino group or, if the amino group was substituted, only such substituent groups that can easily be split off with alkalis have been used. It could, therefore, not have been expected that compounds with a substituted amino group, which substituent cannot be split off by means of alkalis, are also suitable for the condensation.

The interaction with the compounds containing the above said secondary amino group proceeds unexpectedly more rapidly or easier than with the compounds containing the primary amino group. The condensation can be carried out in a shorter time or at a lower temperature, or in the presence of a smaller quantity of alkali or with a lower alkali concentration and, therefore, under smoother and cheaper conditions. The condensation products deriving from the secondary amines are not identical with those prepared from primary amines as they give, in concentrated sulphuric acid, redder or bluer solutions respectively and, therefore, redder shades on cotton. Furthermore, they produce stronger shares and purer dyeings which are faster to light.

The present process can be carried out in the known way, if necessary under pressure, and the starting products can be used in equimolecular or various proportions. The aromatic compounds containing the nuclear-bound group NH.X can be used alone or in mixture; they can further be partially replaced by the respective or other suitable amino compounds containing a primary amino group. As aromatic compounds containing the nuclear-bound group NH.X aromatic amines or aminoazo dyestuffs are used, in which one hydrogen of the amino group is replaced for instance by groups, like $CH_3$, $C_2H_5$, $C_2H_4OH$, $C_3H_5(OH)_2$, $CH_2COOH$, $C_2H_4.SO_3H$,

and so on. A great number of secondary amines useful for the condensation according to the present process can be prepared by introducing the said or similar alkyl radicals into the amino group of aniline, toluidines, xylidines, anisidines, meta- and para-phenylene diamine, 1-amino-3-methoxy-6-methylbenzene, of 1-amino-2:5-dimethoxybenzene or of various napthylamines. Also heterocyclic alkylamino derivatives, like alkylamino-diaryltriazols and their sulfo and carboxylic acids may be used.

Suitable azo dyestuffs with a secondary amino group can be prepared by coupling secondary amines, in which the p-position to the secondary amino group is free, with diazotized aminobenzene sulphonic acids or their substitution products or with diazotized o-aminocarboxylic acids or o-aminophenolsulphonic acids.

Further suitable azo dyestuffs for the condensation can be obtained by coupling diazotized unsulphonated amines or o-aminophenols with monoalkylamines containing in their alkyl radical a carboxylic or a sulphonic acid group.

Further suitable azo dyestuffs can be prepared by coupling diazotized amines or aminophenols in an alkaline medium with N-monoalkylaminonaphthol sulphonic acids.

The following examples, wherein the parts are by weight, illustrate the present invention without limiting it.

*Example 1*

47.4 parts of the sodium salt of 4:4'-dinitrostilbene-2:2'-disulphonic acid, 30 parts of N-methylaniline, 500 parts of water and 60 parts of 30% caustic soda lye are heated to boiling under reflux. Already during the heating up the reaction mixture becomes intensively colored yellow and the condensation product begins, after a short time, to precipitate in form of beautiful prisms. After heating for 5 to 6 hours the condensation is finished, the excess of methylaniline is distilled off with steam and the dyestuff filtered off. It is soluble in concentrated sulphuric acid with a bluish-red coloration and dyes cotton in yellow-orange shades which are stronger and redder than those produced with the dyestuff obtained under the same reaction conditions from aniline.

By treating this dyestuff with reducing agents, for instance with glucose in an aqueous alkaline solution, according to the process of the German Patent No. 113,513, a reaction product will be obtained that is stronger in color than the starting dyestuff and which dyes cotton in orange shades which are fast to light. The new dyestuff is soluble in concentrated sulphuric acid with a violet coloration.

Instead of monomethylaniline, one can use for the condensation for example hydroxyethylaniline, $\beta:\gamma$-dihydroxypropylaniline, phenylglycine or the secondary bases obtained by reaction of 1 mol of aniline with 1 mol of chlorethane sulphonic acid or 1 mol of 1-chloro-2-hydroxypropane-3-sulphonic acid. Also the respective alkyl derivatives of toluidines, of m- and p-xylidine, of anisidines or of naphthylamines can be condensed with dinitrostilbene disulphonic acid or dinitrobenzyldisulphonic acid.

*Example 2*

25.5 parts of the azo dyestuff prepared by coupling diazotized aniline with phenylglycine in an acid medium, 47.4 parts of the sodium salt of 4:4'-dinitrostilbene-2:2'-disulphonic acid, 80 parts of 30% caustic soda lye and 500 parts of water are boiled under reflux for 8 hours. The new dyestuff crystallizes out, for the greatest part, already during the condensation and can be filtered off after cooling down. In dry state, it is a yellow powder soluble in sulphuric acid with violet coloration and dyeing cotton in yellow-orange shades of good fastness properties.

By treating this dyestuff in the presence of alkali with glucose, a dyestuff will be obtained that dyes cotton in red-orange shades. It is soluble in concentrated sulphuric acid with a blue coloration.

A similar dyestuff can be obtained without subsequent reduction by conducting the condensation under pressure at 110°–115° C. and if necessary by using an excess of the aminoazo dyestuff.

The condensation of 4:4'-dinitrostilbene-2:2'-disulphonic acid can be performed also very easily, if, instead of the azobenzeneglycine, dyestuffs are used which can be prepared by coupling a diazotized aromatic amine with secondary amines with a free p-position which contain in the alkyl group another water-solubilizing acid group.

*Example 3*

29.1 parts of the azo dyestuff prepared by coupling diazotized 1-aminobenzene-4-sulphonic acid with N-monomethylaniline in an acid solution, 47.4 parts of the sodium salt of 4:4'-dinitrostilbene-2:2'-disulphonic acid, 60 parts of 30% caustic lye and 600 parts of water are boiled for 10 hours. The dyestuff is salted out in the usual way and filtered off. In the dry state it is a yellow-brown powder which is soluble in concentrated sulphuric acid with a pure blue coloration and dyeing cotton in orange shades which are fast to light.

By reducing this dyestuff in an alkaline solution in the usual way or by carrying out the condensation, if necessary in the presence of an excess of the aminoazo dyestuff, under pressure at 110°–115° C., a dyestuff will be obtained which is soluble in concentrated sulphuric acid with a greenish-blue coloration and which gives on cotton dyeings which are faster to light than the known unreduced dyestuffs.

*Example 4*

35.1 parts of the azo dyestuff prepared by coupling diazotized 1-aminobenzene-3-sulphonic acid with 1-hydroxyethylamino-2-methoxybenzene in an acid medium, 47.4 parts of the sodium salt of 4:4'-dinitrostilbene-2:2'-disulphonic acid, 500 parts of water and 80 parts of 30% caustic soda lye are condensed at boiling temperature. The produced dyestuff is separated by salting it out and purified by treating it in an alkaline solution at 80°–90° C. with sodium hypochlorite. It is soluble in concentrated sulphuric acid with violet coloration and dyes cotton in pure orange shades of good fastness properties.

By reducing his dyestuff in an alkaline solution a new dyestuff will be obtained which is soluble in sulphuric acid with a pure blue coloration and which dyes cotton in red-orange shades which are fast to light.

*Example 5*

70.2 parts of the azo dyestuff prepared by coupling of diazotized 2-amino-1-methoxybenzene-4-sulphonic acid with 1-methylamino-3-methoxybenzene in an acid solution, 47.4 parts of the sodium salt of 4:4'-dinitrostilbene-2:2'-disulphonic acid, 700 parts of water and 70 parts of 30% caustic soda lye are condensed at the boiling temperature. The formation of the dyestuff is very rapid and the condensation product crystallizes out, for the greatest part, already during the boiling. The new dyestuff can be purified by treating it with sodium hypochlorite. It is soluble in concentrated sulphuric acid with a blue coloration and dyes cotton in full red-orange shades possessing good fastness properties.

*Example 6*

33.7 parts of the azo dyestuff, prepared by coupling of diazotized 2-amino-1-hydroxybenzene-4-sulphonic acid with 1-methylamino-3-methoxybenzene in a mineral-acid medium, 47.4 parts of the sodium salt of 4:4'-dinitrostilbene-2:2'-disulphonic acid and 600 parts of 5% caustic soda lye are condensed at the boiling temperature. The dyestuff is isolated by salting it out and by neutralisation of the caustic soda lye with acetic acid. It is soluble in concentrated sulphuric acid with a blue coloration and dyes cotton in full red-orange shades of good fastness to light.

The dyestuff corresponds to the formula

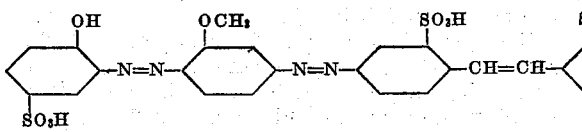

As this dyestuff contains metallizable groups, it can be transformed for instance into the respective copper compound. For this purpose the dyestuff is dissolved at about 90° C. in 1000 parts of water and the calculated quantity of an ammoniacal copper sulphate solution is added thereto. The difficultly soluble copper salt of the stilbene dyestuff precipitates immediately and becomes transformed, after heating for several hours at 90° C. under splitting off of methylamine, into the easily water-soluble complex copper compound. This copper compound is precipitated by salting out and filtered. In the dry state the dyestuff is a dark-brown powder soluble in concentrated sulphuric acid with a blue coloration and dyeing cotton in brown-violet shades being fast to light.

If, instead of 1-methylamino-3-methoxybenzene, the glycine of 1-amino-3-methoxy-6-methylbenzene or the glycine of 1-amino-2:5-dimethoxybenzene respectively is used, dyestuffs will be obtained after condensation which dye cotton in metalfree state in brown-red or red-violet shades respectively. As copper compounds they give grey to grey-green dyeings.

Example 7

17 parts of the azo dyestuff, obtained by coupling diazotized 2-amino-1-hydroxybenzene-4-sulphonic acid with 1-methylamino-3-methoxybenzene in a mineral acid solution, 14 parts of 4-amino-1:1'-azobenzene-4'-sulphonic acid, 47.4 parts of the sodium salt of 4:4'-dinitrostilbene-2:2'-disulphonic acid and 600 parts of 6% caustic soda lye are condensed at the boiling temperature. A dyestuff will be obtained which, in form of its copper complex, dyes cotton in brown shades of good fastness to light.

This dyestuff corresponds to the formula

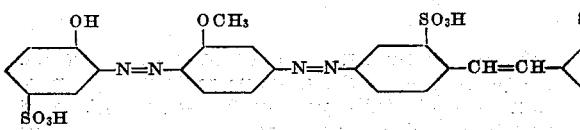

By changing the proportions of both azo dyestuffs, dyestuffs will be obtained which dye cotton, in form of their copper compounds, in deep dark-brown to yellow-brown shades.

By replacing the azo dyestuff from 1-methylamino-3-methoxybenzene totally or partially by a corresponding azo dyestuff from a 1-monoalkylamino-3-methoxy-6-methylbenzene or from a 1-monoalkylamino-2:5-dimethoxybenzene, dyestuffs will be obtained which dye cotton as copper complex compounds in brown, olive and grey shades.

The changing of these shades to yellow or to red can be obtained by replacing 4-amino-1:1'-azobenzene-4'-sulphonic acid totally or partially by analogous dyestuffs which can be obtained by coupling various diazotized aminobenzene sulphonic acids or naphthylamino sulphonic acids, for example with o- or m-toluidine, p-xylidine, o- or m-anisidine, cresidine, dimethoxyaniline or α-naphthylamine.

Example 8

45.1 parts of the azo dyestuff, prepared by coupling diazotized 1-amino-4-methylacetylamino-2-methoxybenzene with 2-naphthol-4-sulphonic acid in an alkaline medium, 47.4 parts of the sodium salt of 4:4'-dinitrostilbene-2:2'-disulphonic acid and 600 parts of 6% caustic soda lye are condensed at the boiling temperature. The dyestuff thus obtained is soluble in concentrated sulphuric acid with a pure blue coloration and dyes cotton in violet shades. As copper-complex compound it gives greenish-grey shades.

By condensing, under the same conditions, the azo dyestuff from diazotized 1-amino-4-methylacetamino-2:5-dimethoxybenzene and 2-naphthol-4-sulphonic acid a stilbene dyestuff will be obtained which, when metal-free, dyes cotton in blue shades and in form of the copper complex compound in blue-grey shades.

Example 9

37.2 parts of the aminoazo dyestuff prepared by coupling of diazotized 2-amino-4-chloro-1-hydroxybenzene-6-sulphonic acid in an acid medium with 1-methylamino-3-methoxybenzene are condensed with 47.4 parts of the sodium salt of 4:4'-dinitrostilbene-2:2'-disulphonic acid, dissolved in 600 parts of 5% caustic soda lye during 8 hours at the boil. The dyestuff which corresponds to the formula

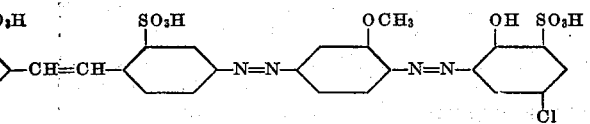

is precipitated after partial neutralisation of the caustic soda lye, salted out and filtered. It is soluble in concentrated sulphuric acid with a blue coloration and dyes cotton in red-brown shades possessing good fastness to light.

The wet filter cake of the dyestuff is dissolved in 200 parts of hot water. To this solution is added a copper ammonium solution prepared from 25 parts of crystallized copper sulphate and the solution heated for several hours at 90°–95° C. The copper compound thus formed is salted out, filtered and dried. The dyestuff is, in dry form, a grey-black powder, soluble in concentrated sulphuric acid with a blue coloration and dyeing cotton in grey-violet shades of good fastness properties.

Example 10

20 parts of the aminoazo dyestuff prepared by coupling of diazotized 2-amino-4-chloro-1-hydroxybenzene-6-sulphonic acid in an acid medium with 1-methylamino-3-methoxybenzene and 20 parts of 4-amino-1:1'-azobenzene-4:4'-sulphonic acid are condensed at the boil with 47.4 parts of 4:4'-dinitrostilbene-2:2'-disulphonic acid, dissolved in 800 parts of 4% caustic soda. The condensed product is transformed into the respective copper compound by heating it with a solution of 15 parts of crystallized copper sulphate and with an excess of ammonia. It dyes cotton in full brown shades which are fast to light.

By changing the proportions of both the azo dyestuffs, new dyestuffs will be obtained, the copper compounds of which give grey-brown to yellow-brown shades. Further variations of the brown shades can be reached by replacing partially or totally the 4-amino-1:1'-azobenzene-4-sulphonic acid by analogous dyestuffs prepared by coupling diazotized aminobenzene sulphonic acid e. g. with o-toluidine, p-xylidine, cresidine or α-naphthylamine.

What I claim is:

1. In the manufacture of a stilbene dyestuff by condensation of a member selected from the group consisting of 4:4'-dinitrostilbene-2:2'-disulfonic acid and 4:4'-dinitrodibenzyl-2:2'-disulfonic acid with an aromatic compound in presence of a caustic alkali, the improvement which comprises condensing per mol of compound selected from the group consisting of 4:4'-dinitrostilbene-2:2'-disulfonic acid and a 4:4'-dinitrodibenzyl-2:2'-disulfonic acid at least one mol of an aromatic compound containing no primary amino group and selected from the group consisting of compounds of the benzene series and of monoazo compounds of the phenyl-azo-phenyl and phenyl-azo-naphthalene series, which aromatic compound contains a nuclear-bound —NH.X, wherein X stands for a member of the group consisting of methyl, ethyl, hydroxyethyl, dihydroxypropyl, carboxymethyl, sulfoethyl and hydroxysulfoethyl, and whereby the secondary amino group reacts with the nitro group with formation of an azo linkage.

2. In the manufacture of a stilbene dyestuff by condensation of 4:4'-dinitrostilbene-2:2'-disulfonic acid with an aromatic compound in presence of a caustic alkali, the improvement which comprises condensing per mol of 4:4'-dinitrostilbene-2.2'-disulfonic acid at least one mol of an aromatic compound containing no primary amino group and selected from the group consisting of compounds of the benzene series and of monoazo compounds of the phenyl-azo-phenyl and phenyl-azo-naphthalene type, which aromatic compound contains a nuclear-bound group —NH.X, wherein X stands for a member of the group consisting of methyl, ethyl, hydroxyethyl, dihydroxypropyl, carboxymethyl, sulfoethyl and hydroxysulfoethyl group and whereby the secondary amino group reacts with the nitro group with formation of an azo linkage.

3. In the manufacture of a stilbene dyestuff by condensation of 4:4'-dinitrostilbene-2:2'-disulfonic acid with an aromatic compound in presence of a caustic alkali, the improvement which comprises condensing per mol of 4:4'-dinitrostilbene-2:2'-disulfonic acid at least one mol of a monoazo dyestuff of the phenyl-azo-phenyl type containing in the p-position to the azo-bridge a nuclear-bound group —NH.X, wherein X stands for a member of the group consisting of methyl, ethyl, hydroxyethyl, dihydroxypropyl, carboxymethyl, sulfoethyl and hydroxysulfoethyl, whereby the secondary amino group reacts with the nitro group with formation of an azo linkage.

4. In the manufacture of a stilbene dyestuff by condensation of 4:4-dinitrostilbene-2:2'-disulfonic acid with an aromatic compound in presence of a caustic alkali, the improvement which comprises condensing per mol of 4:4'-dinitrostilbene-2:2'-disulfonic acid at least one mol of a monoazo dyestuff of the phenyl-azo-phenyl type containing in the p-position to the azo-bridge a methylamino group, which reacts with the nitro group with formation of an azo linkage.

5. In the manufacture of a stilbene dyestuff by condensation of 4:4'-dinitrostilbene-2:2'-disulfonic acid with an aromatic compound in presence of a caustic alkali, the improvement which comprises condensing per mol of 4:4'-dinitrostilbene-2:2'-disulfonic acid at least one mol of a monoazo dyestuff of the formula

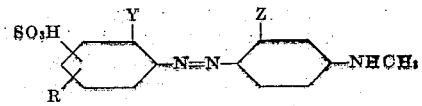

wherein Y represents a member of the group consisting of hydrogen, hydroxyl and alkoxy, Z represents a member of the group consisting of hydrogen and alkoxy and R represents a member of the group consisting of hydrogen and chlorine, and whereby the methylamino group reacts with the nitro group with formation of an azo linkage.

6. In the manufacture of a stilbene dyestuff by condensation of 4:4'-dinitrostilbene-2:2'-disulfonic acid with an aromatic compound in presence of a caustic alkali, the improvement which comprises condensing per mol of 4:4'-dinitrostilbene-2:2'-disulfonic acid at least one mol of a monoazo dyestuff of the formula

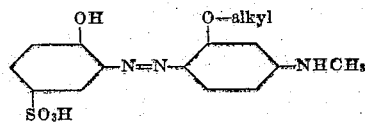

whereby the methylamino group reacts with the nitro group with formation of an azo linkage.

7. In the manufacture of stilbene dyestuffs, the process of condensing one molecular proportion of 4:4'-dinitrostilbene-2:2'-disulfonic acid with two molecular proportions of the monoazo dyestuff of the formula

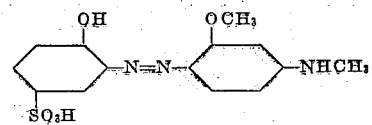

8. In the manufacture of stilbene dyestuffs, the process of condensing one molecular proportion of 4:4'-dinitrostilbene-2:2'-disulfonic acid with two molecular proportions of the monoazo dyestuff of the formula

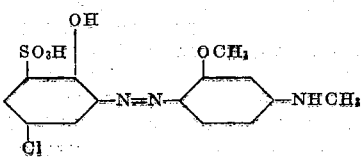

9. In the manufacture of stilbene dyestuffs, the process of condensing one molecular proportion of 4:4'-dinitrostilbene-2:2'-disulfonic acid with one molecular proportion of the monoazo dyestuff of the formula

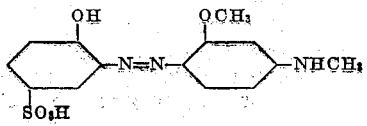

and one molecular proportion of the monoazo dyestuff of the formula

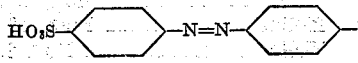

10. The new stilbene dyestuffs obtained by

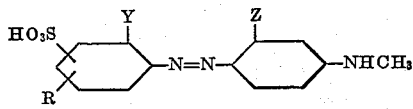

condensation of one molecular proportion of 4:4'-dinitrostilbene-2:2'-disulfonic acid and two molecular proportions of a monoazo dyestuff of the general formula

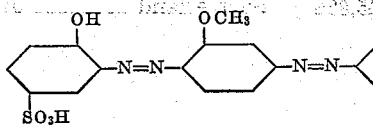

wherein Y represents a member of the group consisting of hydrogen, hydroxyl and alkoxy, Z represents a member of the group consisting of hydrogen and alkoxy and R represents a member of the group consisting of hydrogen and chlorine, which dyestuffs have the general formula

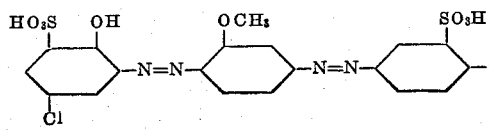

11. The new stilbene dyestuffs obtained by condensation of one molecular proportion of 4:4'-dinitrostilbene-2:2'-disulfonic acid and two molecular proportions of a monoazo dyestuff of the general formula

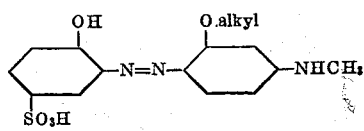

which dyestuffs have the general formula

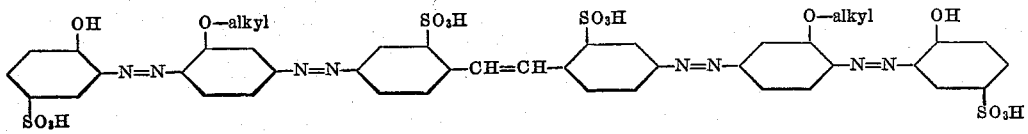

12. The new stilbene dyestuff obtained by condensation of one molecular proportion of 4:4'-dinitrostilbene-2:2'-sulfonic acid and two molecular proportions of the monoazo-dyestuff of the formula

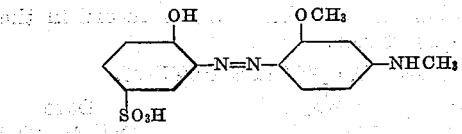

which dyestuff has the formula.

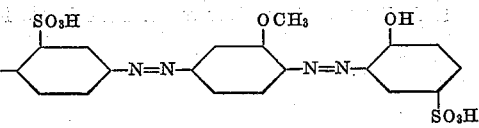

13. The new stilbene dyestuff obtained by condensation of one molecular proportion of 4:4'-dinitrostilbene-2:2'-sulfonic acid and two molecular proportions of the monoazo dyestuff of the formula

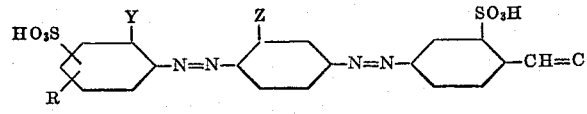

which dyestuff has the formula

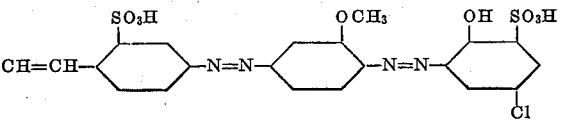

14. The new stilbene dyestuff obtained by condensation of one molecular proportion of 4:4'-dinitrostilbene-2:2'-sulfonic acid, one molecular proportion of the monoazo dyestuff of the formula

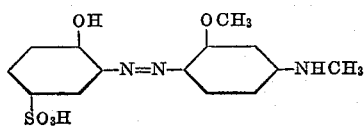

and one molecular proportion of the monoazo

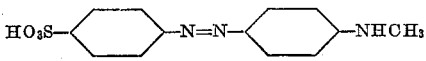

dyestuff of the formula

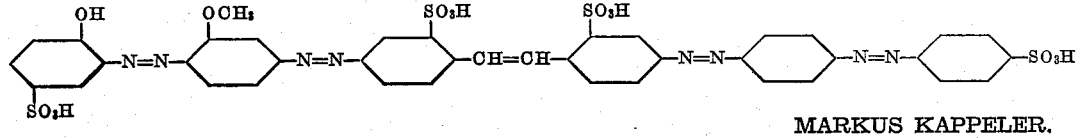

which stilbene dyestuff has the formula

MARKUS KAPPELER.

(References on following page)

REFERENCES CITED

The following references are of record in the file of this patent:

UNITED STATES PATENTS

| Number | Name | Date |
|---|---|---|
| 636,065 | Ris | Oct. 31, 1899 |
| 1,785,845 | Stusser | Dec. 23, 1930 |
| 1,823,743 | Kalischer et al. | Sept. 15, 1931 |
| 1,861,323 | Schmid | May 31, 1932 |
| 1,861,324 | Schmid | May 31, 1932 |
| 2,276,202 | Keller | Mar. 10, 1942 |
| 2,333,427 | Keller | Nov. 2, 1943 |

FOREIGN PATENTS

| Number | Country | Date |
|---|---|---|
| 145,884 | Switzerland | June 1, 1931 |